US011856339B2

(12) United States Patent
Li et al.

(10) Patent No.: US 11,856,339 B2
(45) Date of Patent: Dec. 26, 2023

(54) AUTOMATIC FOCUSING PROJECTION METHOD AND SYSTEM

(71) Applicant: IVIEW DISPLAYS (SHENZHEN) COMPANY LTD., Shenzhen (CN)

(72) Inventors: Wenxiang Li, Shenzhen (CN); Mingnei Ding, Shenzhen (CN); Steve Yeung, Hong Kong (CN); Zhiqiang Gao, Hong Kong (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 92 days.

(21) Appl. No.: 17/544,121

(22) Filed: Dec. 7, 2021

(65) Prior Publication Data
US 2022/0210381 A1 Jun. 30, 2022

Related U.S. Application Data

(63) Continuation of application No. PCT/CN2021/082411, filed on Mar. 23, 2021.

(30) Foreign Application Priority Data

Dec. 31, 2020 (CN) .......................... 202011623664.5

(51) Int. Cl.
*H04N 9/31* (2006.01)
*G06T 7/521* (2017.01)
(Continued)

(52) U.S. Cl.
CPC ............... *H04N 9/317* (2013.01); *G02B 7/08* (2013.01); *G06T 7/521* (2017.01); *G01B 11/25* (2013.01);
(Continued)

(58) Field of Classification Search
CPC ...... G03B 21/008; G03B 21/28; G03B 21/53; G03B 21/142; G03B 21/147; H04N 9/315;
(Continued)

(56) References Cited

U.S. PATENT DOCUMENTS

| 7,980,703 B2* | 7/2011 | Yamamoto | ............. G03B 21/53 |
| | | | 353/70 |
| 10,104,351 B2* | 10/2018 | Muramatsu | .......... H04N 9/3185 |
| 2021/0033710 A1* | 2/2021 | Matsumoto | ............ H04N 23/56 |

FOREIGN PATENT DOCUMENTS

| CN | 101025551 A | 8/2007 |
| CN | 107885023 A | 4/2018 |

(Continued)

*Primary Examiner* — Sultan Chowdhury
(74) *Attorney, Agent, or Firm* — IPRO, PLLC; Na Xu (57) ABSTRACT

Embodiments of the present disclosure relate to the technical field of digital projection and display, and in particular, relate to an automatic focusing projection method and system. The embodiments provide an automatic focusing projection method, which is applicable to an automatic focusing projection system. The automatic focusing projection system includes a ranging unit, a projection unit, and a reflection unit. The method includes: acquiring a depth image from the ranging unit, and acquiring a vertical projection distance from the ranging unit to a projection plane based on the depth image; acquiring position information of a center point of a projection picture in the depth image based on an elevation angle of the reflection unit and the vertical projection distance; acquiring a projection distance between the projection unit and the projection picture based on the position information; and performing focus adjustment on the projection unit based on the projection distance.

17 Claims, 4 Drawing Sheets

(51) Int. Cl.
*G02B 7/08* (2021.01)
*G01B 11/25* (2006.01)
*G01S 17/894* (2020.01)

(52) U.S. Cl.
CPC ... *G01S 17/894* (2020.01); *G06T 2207/10028* (2013.01); *G06T 2207/20068* (2013.01)

(58) Field of Classification Search
CPC .... H04N 9/317; H04N 9/3102; H04N 9/3152; H04N 9/3155; H04N 9/3182; H04N 9/3185; G02B 7/08; G02B 7/32; G02B 7/282; G01S 17/66; G01S 17/88; G01S 17/89; G01S 17/90; G01S 17/894; G01B 11/22; G01B 11/25; G01B 11/167; G01B 11/2504
See application file for complete search history.

(56) References Cited

FOREIGN PATENT DOCUMENTS

| | | |
|---|---|---|
| CN | 110191328 A | 8/2019 |
| CN | 110677630 A | 1/2020 |
| JP | 5262253 A | 8/2013 |

* cited by examiner

```
┌─────────────────────────────────────────────────────────────┐
│ Acquire a depth image from the ranging unit, and acquire a  │  S1
│ vertical projection distance from the ranging unit to a     │
│ projection plane based on the depth image                   │
└─────────────────────────────────────────────────────────────┘
                              │
                              ▼
┌─────────────────────────────────────────────────────────────┐
│ Acquire position information of a center point of a         │  S2
│ projection picture in the depth image based on an elevation │
│ angle of the reflection unit and the vertical projection    │
│ distance                                                    │
└─────────────────────────────────────────────────────────────┘
                              │
                              ▼
┌─────────────────────────────────────────────────────────────┐
│ Acquire a projection distance between the projection unit   │  S3
│ and the projection picture based on the position information│
└─────────────────────────────────────────────────────────────┘
                              │
                              ▼
┌─────────────────────────────────────────────────────────────┐
│ Perform focus adjustment on the projection unit based on    │  S4
│ the projection distance                                     │
└─────────────────────────────────────────────────────────────┘
```

FIG. 4

| Acquire the depth image from the ranging unit, and determine a depth corresponding to a center position of the depth image as the vertical projection distance | S11 |

FIG. 5

| Acquire the position information based on the elevation angle, the vertical projection distance, and a first correspondence table, wherein the first correspondence table indicates a corresponding relationship among the elevation angle, the vertical projection distance, and the position information | S21 |

AUTOMATIC FOCUSING PROJECTION METHOD AND SYSTEM

CROSS-REFERENCE TO RELATED APPLICATION

This application is a continuation of International Patent Application NO. PCT/CN2021/082411, filed on Mar. 23, 2021, which is based upon and claims priority to Chinese Patent Application No. 202011623664.5, filed before China National Intellectual Property Administration on Dec. 31, 2020 and entitled "AUTOMATIC FOCUSING PROJECTION METHOD AND SYSTEM," the entire contents of which are incorporated herein by reference.

TECHNICAL FIELD

Embodiments of the present disclosure relate to the technical field of digital projection and display, and in particular, relate to an automatic focusing projection method and system.

BACKGROUND

In recent years, with rapid development of semiconductor and display technologies, the projection technology is quickly advanced, and more and more projection devices are available in the market. At present, the motion projection technology is desired in various application scenarios, for example, large-scale stages, security and alarming, smart traffic and the like. Specific demands in different scenarios are accommodated by movement of the projection picture in the space. In a motion projection system, an important subject is real-time automatic focusing. Since a projection position of the motion projection system constantly varies, the projection distance may constantly vary correspondingly. Where a fixed-focus scheme is employed, a projection picture is inevitably subject to blurring. Therefore, in the motion projection system, the real-time automatic focusing technology is desired.

At present, some schemes have been attempted and applied in the motion projection system. For example, a time of flight (TOF) assembly is configured beside a projector optical engine, and the projector optical engine and the TOF assembly collaboratively move. Since the projection picture is constantly at the center of a detection region of the TOF assembly, a center detection distance of the TOF assembly is a projection distance of the system. In practice, a position of a focusing lens may be adjusted based on the projection distance, such that automatic focusing is achieved.

However, in a reflective motion projection (that is, motion of the projection picture is controlled by rotation of a mirror) system, an effective real-time automatic focusing scheme is still unavailable at present.

SUMMARY

A technical solution employed by the embodiments of the present disclosure is an automatic focusing projection method. The method is applicable to an automatic focusing projection system. The automatic focusing projection system includes a ranging unit, a projection unit, and a reflection unit, wherein the ranging unit is configured to acquire a depth image, the projection unit is configured to project an image, and the reflection unit is configured to change a direction of outgoing light of the projection unit. The automatic focusing projection method includes: acquiring a depth image from the ranging unit, and acquiring a vertical projection distance from the ranging unit to a projection plane based on the depth image; acquiring position information of a center point of a projection picture in the depth image based on an elevation angle of the reflection unit and the vertical projection distance; acquiring a projection distance between the projection unit and the projection picture based on the position information; and performing focus adjustment on the projection unit based on the projection distance.

Some embodiments of the present disclosure further provide an automatic focusing projection system. The automatic focusing projection system includes: a ranging unit, a projection unit, a reflection unit, and a control unit; wherein the control unit is connected to the ranging unit, the projection unit, and the reflection unit; the ranging unit is configured to acquire a depth image; the projection unit is configured to project an image, wherein the projection unit includes a focusing device and a projection lens movable along an optical axis, the focusing device being configured to regulate a position of the projection lens; the reflection unit is configured to change a direction of outgoing light of the projection unit; and the control unit includes at least one processor, and a memory communicably connected to the at least one processor, wherein the memory is configured to store one or more instructions executable by the at least one processor, wherein the one or more instructions, when executed by the at least one processor, cause the at least one processor to perform the automatic focusing projection method as described above.

Some embodiments of the present disclosure further provide a non-volatile computer-readable storage medium storing one or more computer-executable instructions, wherein the one or more computer-executable instructions, when executed by a processor, cause the processor to perform the automatic focusing projection method as described above.

Some embodiments of the present disclosure further provide a computer program product. The computer program product includes one or more computer programs stored in a non-volatile computer-readable storage medium, wherein the one or more computer programs include one or more program instructions, which, when executed by a computer, cause the computer to perform the automatic focusing projection method according to the first aspect.

BRIEF DESCRIPTION OF THE DRAWINGS

One or more embodiments are illustrated by way of example, and not by limitation, in the figures of the accompanying drawings, wherein elements/modules and steps having the same reference numeral designations represent like elements/modules and steps throughout. The drawings are not to scale, unless otherwise disclosed.

FIG. 3(1) is a schematic diagram of an optical path of an automatic focusing projection system according to an embodiment of the present disclosure;

FIG. 3(2) is a schematic diagram of an optical path of an automatic focusing projection system according to another embodiment of the present disclosure;

FIG. 7(1) is a schematic diagram of an exit optical path of an automatic focusing projection system according to an embodiment of the present disclosure as seen from a direction perpendicular to paper;

FIG. 7(2) is a schematic diagram of an exit optical path of an automatic focusing projection system according to an embodiment of the present disclosure as seen vertically from the above.

DETAILED DESCRIPTION

The present disclosure is further described with reference to some exemplary embodiments. The embodiments hereinafter facilitate further understanding of the present disclosure for a person skilled in the art, rather than causing any limitation to the present disclosure. It should be noted that persons of ordinary skill in the art may derive various variations and modifications without departing from the inventive concept of the present disclosure. Such variations and modifications shall pertain to the protection scope of the present disclosure.

For better understanding of the present disclosure, the present disclosure is described in detail with reference to attached drawings and specific embodiments. Unless the context clearly requires otherwise, throughout the specification and the claims, technical and scientific terms used herein denote the meaning as commonly understood by a person skilled in the art. Additionally, the terms used in the specification of the present disclosure are merely for describing the objectives of the specific embodiments, and are not intended to limit the present disclosure. As used herein, the term "and/or" in reference to a list of one or more items covers all of the following interpretations of the term: any of the items in the list, all of the items in the list and any combination of the items in the list.

It should be noted that, in the absence of conflict, embodiments of the present disclosure and features in the embodiments may be incorporated, which all fall within the protection scope of the present disclosure. In addition, although function module division is illustrated in the schematic diagrams of devices, and in some occasions, module division different from the divisions of the modules in the devices may be used. Further, the terms "first," "second," and the like used in this text do not limit data and execution sequences, and are intended to distinguish identical items or similar items having substantially the same functions and effects.

Figure 1:
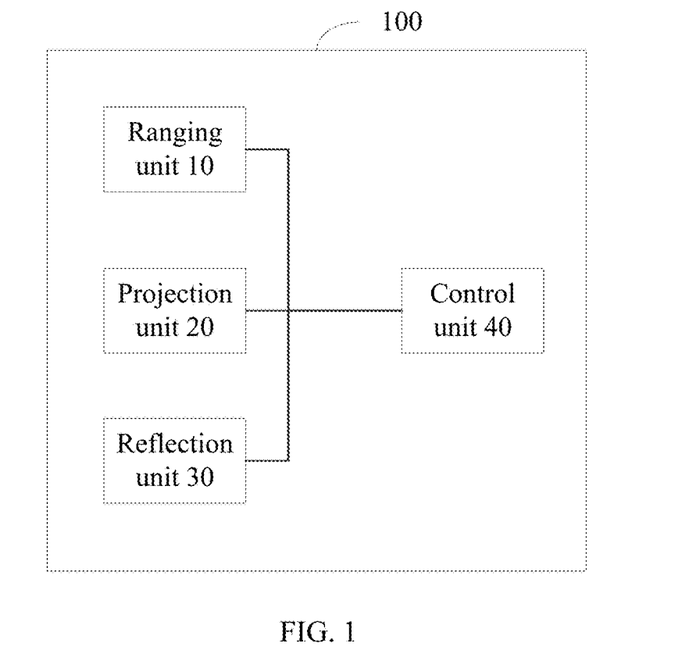
FIG. 1 is a schematic structural block diagram of an automatic focusing projection system according to an embodiment of the present disclosure.

Referring to FIG. 1, FIG. 1 is a schematic structural block diagram of an automatic focusing projection system 100 according to an embodiment of the present disclosure. As illustrated in FIG. 1, the automatic focusing projection system 100 includes: a ranging unit 10, a projection unit 20, a reflection unit 30, and a control unit 40. The control unit 40 is connected to the ranging unit 10, the projection unit 20, and the reflection unit 30.

The ranging unit 10 is configured to acquire a depth image. In some embodiments, the ranging unit 10 is a 3D camera, a TOF sensor, and/or a structured light camera. In some other embodiments, the ranging unit 10 may also be a microwave radar, or any other suitable ranging devices, which is not limited herein.

The reflection unit 30 is configured to change a direction of outgoing light of the projection unit 20. Specifically, the reflection unit 30 is disposed rightly opposite to the projection unit 20, and may adjust a relative angle with respect to the projection unit 20 and adjust a direction of a light ray emitted from the projection unit 20. In an embodiment of the present disclosure, the reflection unit 30 preferably employs an optical device with a high reflectivity, to ensure quality of a projection picture, and the reflection unit 30 is a reflection device provided with a rotation mechanism. The rotation mechanism preferably employs a device with a high measurement accuracy of a rotation angle, to ensure that a rotation angle of the reflection unit 30 is accurately and precisely adjusted.

The projecting unit 20 is configured to project projection content. Specifically, the projection content of the projection unit 20 includes an image, a video, or a Unity animation. In some embodiments, the projection unit 20 includes a focusing device and a projection lens movable along an optical axis. The focusing device is connected to the control unit 40, and is configured to adjust a position of the projection lens based on a signal from the control unit 40.

The control unit 40 is configured to control the ranging unit 10, the projection unit 20, and the reflection unit 30 to operate, and process data to acquire a result. The control unit 40 includes: at least one processor, and a memory communicably connected to the at least one processor; wherein the memory stores one or more instructions executable by the at least one processor, wherein the one or more instructions, when executed by the at least one processor, cause the at least one processor to perform the automatic focusing projection method according to any method embodiment hereinafter.

Figure 2:
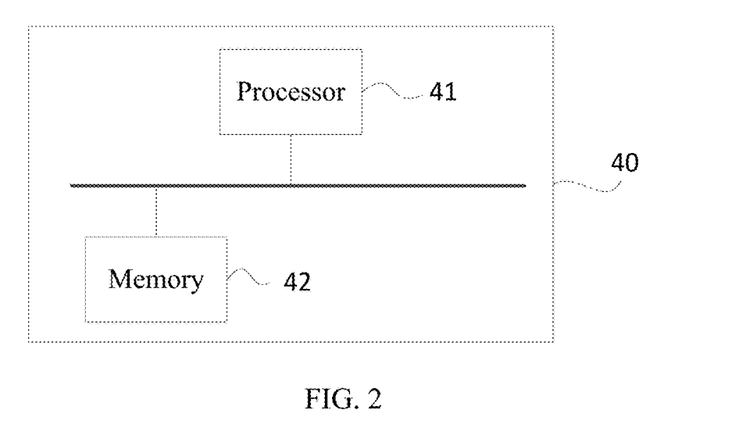
FIG. 2 is a schematic structural block diagram of a control unit according to an embodiment of the present disclosure.
Figure 3:
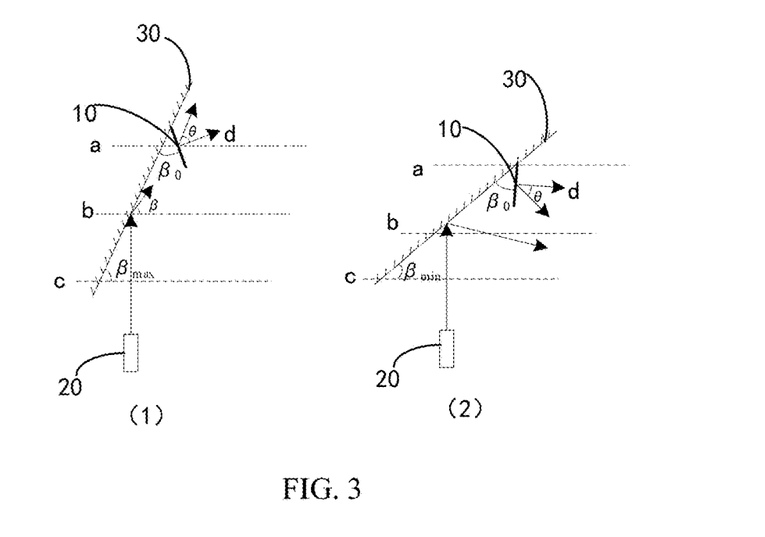

As illustrated in FIG. 2, the control unit 40 includes at least one processor 41, and a memory 42 communicably connected to the at least one processor 41. FIG. 2 uses one processor 41 as an example.

The processor 41 and the memory 42 may be connected via a bus or in another manner, and FIG. 2 uses the bus as an example.

The memory 42, as a non-volatile computer readable storage medium, may be used to store non-volatile software programs, and non-volatile computer executable programs and modules. The non-volatile software programs, instructions and modules stored in the memory 42, when executed, cause the processor 41 to perform various function applications and data processing of the control unit, that is, performing the automatic focusing projection method according to any method embodiment hereinafter.

The memory 42 may include a program memory area and data memory area, wherein the program memory area may store operation systems and application programs needed by at least function; and the data memory area may store data created according to the use of the automatic focusing projection system. In addition, the memory 42 may include a high-speed random-access memory, or include a non-volatile memory, for example, at least one disk storage device, a flash memory device, or another non-volatile solid storage device. In some embodiments, the memory 42 optionally includes memories remotely configured relative to the processor 41. These memories may be connected to the processor over a network. Examples of the above network include, but not limited to, the Internet, Intranet, local area network, mobile communication network and a combination thereof.

In some embodiments, referring to FIG. 3(1), the reflection unit 30 is a mirror. An initial emitted light ray of the projection unit 20 of the automatic focusing projection system 100 is vertical and upward, and the mirror 30 is disposed in the vertical direction, and meanwhile it should be noted that horizontal lines a, b, and c are horizontal lines at the same height. In this case, a center of the ranging unit 10 and a reflection center point of the mirror 30 are at the same height, and a spacing between the center of the ranging unit 10 and the reflection center point needs to be as small as possible. The reflection center point is also a center reflection point of the emitted light ray of the projection unit 20 on the mirror 30. Since the ranging unit 10 and the mirror 30 define an angle of $\beta_0$ in the vertical direction, the mirror 30 has a minimum elevation angle and a maximum elevation angle. In order that the ranging unit 10 is capable of detecting a position of the projection picture, a half angle of view of the ranging unit 10 shall satisfy:

$\theta > \frac{1}{2}(\beta_{max} - \beta_{min})$ wherein $\theta$ represents the half angle of view of the ranging unit 10, $\beta_{min}$ represents the minimum elevation angle of the mirror, $\beta_{max}$ and represents the maximum elevation angle of the mirror. This relational formula is derived as follows:

First, still referring to FIG. 3(1), it should be noted that the horizontal lines a, b, and c are horizontal lines at the same height; and in the case that the mirror reaches the maximum elevation angle $\beta_{max}$, where the initial emitted light ray of the projection unit 20 is reflected by the mirror 30, the elevation angle of the reflected light is $$\beta = 2\beta_{max} - \frac{\pi}{2},$$

and an elevation angle of the ranging unit 10 in a normal d direction is $$\beta_r = \beta_{max} + \beta_0 - \frac{\pi}{2}.$$

Then in order that the ranging unit 10 is capable of detecting a distance to the position of the projection picture, the following condition shall be satisfied:

$\beta_r + \theta \geq \beta$

That is:

$$\beta_{max} + \beta_0 - \frac{\pi}{2} + \theta \geq 2\beta_{max} - \frac{\pi}{2}$$

It is thus derived as follows:

$\theta \geq \beta_{max} - \beta_0$

Second, referring to FIG. 3(2), in the case that the mirror reaches the minimum elevation angle $\beta_{min}$, where the initial emitted light ray of the projection unit 20 is reflected by the mirror 30, the elevation angle of the reflected light ray is $$\beta = 2\beta_{min} - \frac{\pi}{2},$$

and an elevation angle of the ranging unit 10 in the normal d direction is $$\beta_r = \beta_{min} + \beta_0 - \frac{\pi}{2}.$$

Then in order that the ranging unit 10 is capable of detecting a distance to the position of the projection picture, the following condition shall be satisfied:

$\beta_r - \theta \leq \beta$

That is:

$$\beta_{min} + \beta_0 - \frac{\pi}{2} - \theta \leq 2\beta_{min} - \frac{\pi}{2}$$

It is thus derived as follows:

$\theta \leq \beta_0 - \beta_{min}$

A mounting angle and a minimum angle of view of the ranging unit 10 are acquired in combination with $\theta > \beta_{max} - \beta_0 - \beta_{min}$:

$\beta_0 = \frac{1}{2}(\beta_{min} + \beta_{max})$ $\theta = \frac{1}{2}(\beta_{max} - \beta_{min})$ In practice, the ranging unit 10 with an even greater angle of view may also be used, that is, $\theta > \frac{1}{2}(\beta_{max} - \beta_{max})$, to ensure that a motion region of the projection picture is sufficiently covered. In practice, the mounting angles of the ranging unit 10 and the mirror 30 may be defined according to the actual needs, as long as $\theta \geq \beta_{max} - \beta_0$ and $\theta \geq \beta_0 - \beta_{min}$ are satisfied.

Figure 4:
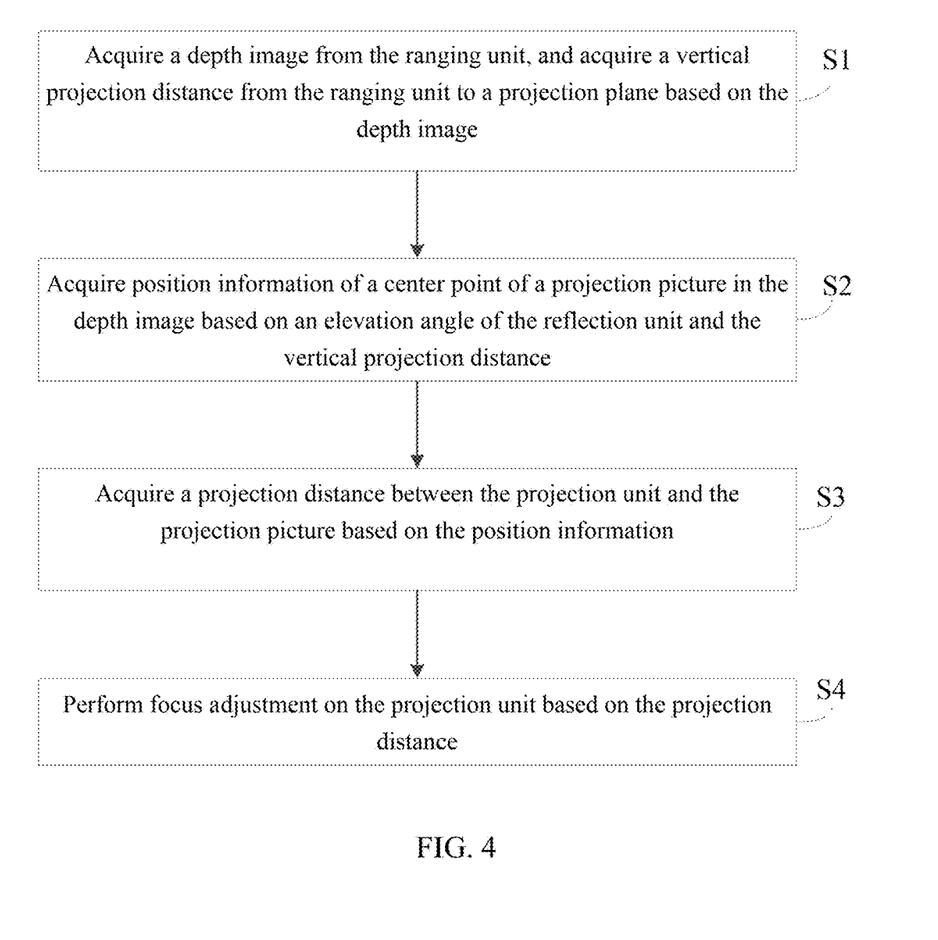
FIG. 4 is a schematic flowchart of an automatic focusing projection method according to an embodiment of the present disclosure.

The present disclosure further provides an embodiment of an automatic focusing projection method, which is applicable to the automatic focusing projection system as described above. Referring to FIG. 4, a schematic flowchart of an automatic focusing projection method according to an embodiment of the present disclosure is illustrated. The method includes, but is not limited to, the following steps.

In step S1, a depth image from the ranging unit is acquired, and a vertical projection distance from the ranging unit to a projection plane is acquired based on the depth image.

Specifically, when the mirror is rotating, the projection picture is moving in a space, and in this case, the ranging unit is capable of measuring distances in real time in various directions and generating a depth image. The acquired depth image information shall include depth information of a projection plane, such that a vertical projection distance from the ranging unit to the projection plane is acquired. In some other embodiments, the depth image information further includes depth information of other objects in the space.

Figure 5:
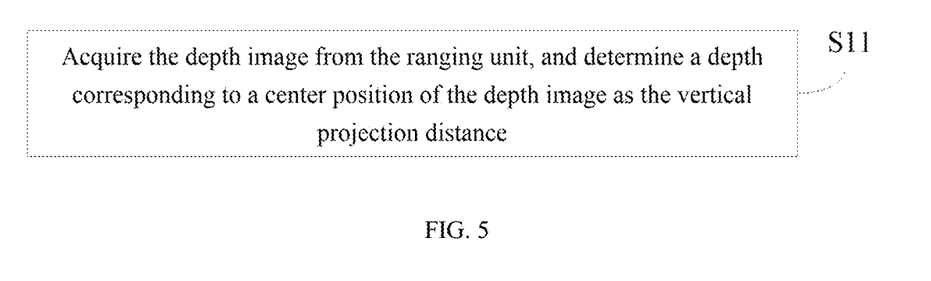
FIG. 5 is a schematic flowchart of step S1 in FIG. 4.

Specifically, referring to FIG. 5, step S1 includes:

sub-step S11: acquiring the depth image from the ranging unit, and determining a depth corresponding to a center position of the depth image as the vertical projection distance.

Since the ranging unit and the reflection center point of the reflection unit may be considered as the same point, a distance corresponding to a center position of the depth image acquired by the ranging unit is made to be approximate to a distance from the reflection center point of the reflection unit to the projection plane. Therefore, the vertical projection distance from the ranging unit to the projection plane is approximately considered as a vertical projection distance from the reflection center point of the reflection unit to the projection plane.

In step S2, position information of a center point of a projection picture in the depth image is acquired based on an elevation angle of the reflection unit and the vertical projection distance.

Figure 6:
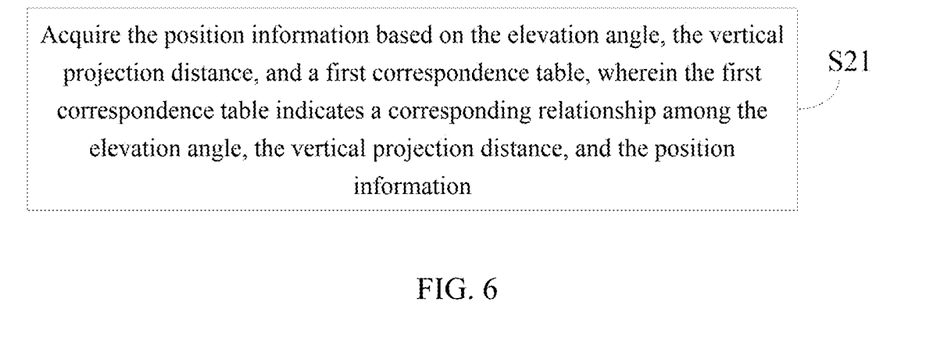
FIG. 6 is a schematic flowchart of step S2 in FIG. 4.
Figure 7:
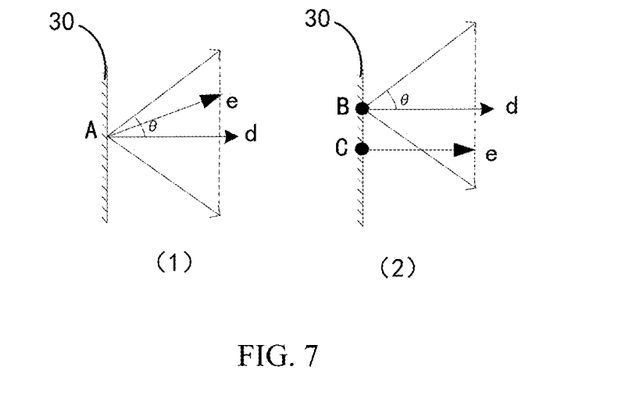

Specifically, referring to FIG. 6, step S2 includes:

sub-step S21: acquiring the position information based on the elevation angle, the vertical projection distance, and a first correspondence table, wherein the first correspondence table indicates a corresponding relationship among the elevation angle, the vertical projection distance, and the position information.

First, referring to FIG. 7(1), in the automatic focusing projection system, since the ranging unit and the reflection center point of the mirror are in the same horizontal plane, as seen from a direction perpendicular to paper, the ranging unit and the reflection center point are coincident at point A. In the case that the elevation angle of the mirror is an elevation angle of a reflected light ray e of the projection unit is $$2\beta - \frac{\pi}{2}.$$

In the case that the angle defined between the ranging unit and the mirror is $\beta_0$, the elevation angle of the ranging unit in the normal d direction is $$\beta + \beta_0 - \frac{\pi}{2}.$$

Accordingly, in the vertical direction, the reflected light ray e of the projection unit is not parallel to the normal d of the ranging unit. Therefore, the projection picture is not positioned at a vertical center position of the depth image acquired by the ranging unit, and the position of the center point of the projection picture in the depth image is related to the elevation angle of the mirror and the vertical projection distance from the reflection center point to the projection plane. Meanwhile, during manufacture of the automatic focusing projection system, referring to FIG. 7(2), as seen vertically from the above, a specific spacing in the horizontal direction is present between the mounting position of the ranging unit and the reflection center point of the reflection unit. Therefore, the projection picture at the projection position is not positioned at a horizontal center of the depth image acquired by the ranging unit, but is subject to displacement in the horizontal direction. As also seen from the drawing, the position of the center point of the projection picture in the depth image varies with variation of the vertical projection distance between the reflection center point to the projection plane.

Therefore, a corresponding relationship among the elevation angle of the mirror, the vertical projection distance, and the position of the center point of the projection picture in the depth image may be pre-established. Specifically, in some embodiments, the corresponding relationship among the elevation angle, the vertical projection distance, and the position information indicated in the first correspondence table are acquired first; and the first correspondence table is established based on the corresponding relationship. For example, a first correspondence table among coordinates (x, y) of the projection picture in the depth image acquired by the ranging unit, the elevation angle $\beta$ of the mirror, and the vertical projection distance $R_p$ of the reflection center point of the mirror to the projection plane may be established first, wherein $\beta_{min} \leq \beta \leq \beta_{max}$, $R_{pmin} \leq R \leq R_{pmax}$, $1 \leq x \leq m, 1 \leq y \leq n$, and $\beta_{min}$ represent the minimum elevation angles of the mirror, $\beta_{max}$ represents the maximum elevation angle of the mirror, $R_{pmin}$ represents a minimum vertical projection distance from the reflection center point of the mirror to the projection plane, $R_{pmax}$ represents a maximum vertical projection distance from the reflection center point of the mirror to the projection plane, and m and n respectively represent a width and a height of the depth image acquired by the ranging unit. Then, the first correspondence table is a set of coordinates of the corresponding center point of the projection picture in the depth image under different elevation angles of the mirror, and different vertical projection distances from the reflection center point of the mirror to the projection plane. It should be noted that during establishment of the first correspondence table, the light ray reflected by the mirror shall be made to be perpendicular to the projection plane, and the projection picture shall be made square. In a practical establishment process, operations may be performed using a variable control method. For example, the angle of the mirror may be first made to a fixed predetermined angle, and then a corresponding relationship between the vertical projection distance and the coordinates is established. In practice, the establishment process may be flexibly configured, which is not limited to the description in the embodiments of the present disclosure.

Since in step S1, the vertical projection distance from the ranging unit to the projection plane is approximately considered as the vertical projection distance from the reflection center point of the mirror to the projection plane, then in the case that a distance corresponding to the center position of the depth image acquired by the ranging unit is acquired, the distance is considered as the vertical projection distance from the reflection center point to the projection plane. Afterwards, position information is acquired by querying based on the elevation angle and the first correspondence table, that is, the coordinates of the center point of the projection picture in the depth image acquired by the ranging unit are acquired.

In step S3, a projection distance between the projection unit and the projection picture is acquired based on the position information.

Specifically, in the case that the coordinates of the position of the center of the projection picture in the depth image are acquired, depth information corresponding to the position coordinates is determined in the depth image, and the projection distance from the projection unit to the projection picture is acquired by adding a fixed predetermined distance from the projection unit to the reflection center point of the reflection unit to the distance corresponding to the depth information. In practice, the fixed predetermined distance may be defined according to the actual needs, which is not limited herein.

In step S4, focus adjustment is performed on the projection unit based on the projection distance.

Since a focal length of the projection lens in the automatic focusing projection system is adjustable between a minimum focal length and a maximum focal length, and in addition, within the zooming range of the projection lens, the focal length of the projection lens is in one-to-one correspondence with the projection distance, the minimum focal length corresponds to a minimum adjustable projection distance, and the maximum focal length corresponds to a maximum adjustable projection distance. The minimum adjustable projection distance and the maximum adjustable projection distance determine the zooming range $[D_0, D_1]$. That is, within a projection distance range $[D_0, D_1]$, the focal length of the projection lens movable along the optical axis may be adjusted by the focusing device, such that the projection picture is clearer.

Figure 8:
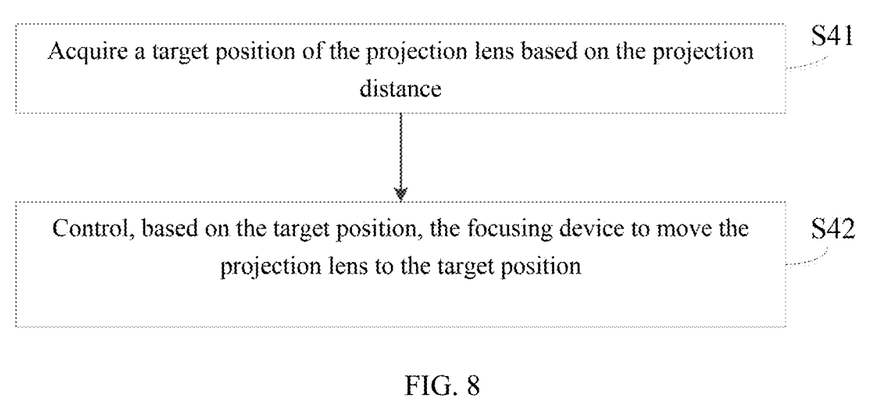
FIG. 8 is a schematic flowchart of step S4 in FIG. 4.

Specifically, referring to FIG. 8, step S4 includes:

sub-step S41: acquiring a target position of the projection lens based on the projection distance; and sub-step S42: controlling, based on the target position, the focusing device to move the projection lens to the target position.

Specifically, the target position of the projection lens is acquired based on the projection distance and a second correspondence table, wherein the second correspondence table indicates a corresponding relationship between the projection distance and a position of the projection lens.

In some embodiments, a second correspondence table between the position of the projection lens and the projection distance may be pre-established within a zooming range of the projection lens. The second correspondence table is a set of the corresponding lens positions under different projection distances within the zooming range of the projection lens. In the case that the projection distance between the projection unit and the projection position is acquired, the target position of the projection lens corresponding to the projection distance is found by querying the second correspondence table, and subsequently, the projection lens is adjusted to the target position by the focusing device, thereby achieving automatic focusing.

In the automatic focusing projection method according to the embodiments of the present disclosure, automatic focusing in reflective motion projection may be achieved in real time. In the case that the elevation angle of the reflection unit or the position of the projection plane is changed, the projection picture may be still maintained clear in the case of moving in the space, such that user visual experience is improved.

An embodiment of the present disclosure further provides a non-volatile computer-readable storage medium. The non-volatile computer-readable storage medium stores one or more computer-executable instructions, which, when executed by one or more processors, for example, the processor 41 as illustrated in FIG. 2, cause the one or more processors to perform the automatic focusing projection method according to any of the above method embodiments, for example, performing the steps as illustrated in FIG. 4 to FIG. 8, and implementing the functions of the device as illustrated in FIG. 1.

An embodiment of the present disclosure further provides a computer program product. The computer program product includes one or more computer programs stored in a non-volatile computer-readable storage medium. The one or more computer programs include one or more program instructions, which, when executed by a computer, cause the computer to perform the automatic focusing projection method in any of the above method embodiments, for example, performing the steps in the methods as illustrated in FIG. 4 to FIG. 8, and implementing the functions of the device as illustrated in FIG. 1.

The embodiments of the present disclosure provide an automatic focusing projection method. The method is applicable to an automatic focusing projection system. The automatic focusing projection system includes a ranging unit, a projection unit, and a reflection unit. The automatic focusing projection method includes: acquiring a depth image from the ranging unit, and acquiring a vertical projection distance from the ranging unit to a projection plane based on the depth image; acquiring position information of a center point of a projection picture in the depth image based on an elevation angle of the reflection unit and the vertical projection distance; acquiring a projection distance between the projection unit and the projection picture based on the position information; and performing focus adjustment on the projection unit based on the projection distance. By the method, automatic focusing may be implemented in a reflective motion projection system.

It should be noted that the above described device embodiments are merely for illustration purpose only. The units which are described as separate components may be physically separated or may be not physically separated, and the components which are illustrated as units may be or may not be physical units, that is, the components may be disposed at the same position or may be distributed into a plurality of network units. Part or all of the modules may be selected according to the actual needs to achieve the objectives of the technical solutions of the embodiments.

According to the above embodiments of the present disclosure, a person skilled in the art may clearly understand that the embodiments of the present disclosure may be implemented by means of hardware or by means of software plus a necessary general hardware platform. Based on such understanding, portions of the technical solutions of the present disclosure that essentially contribute to the related art may be embodied in the form of a software product, the computer software product may be stored in a computer-readable storage medium, such as a read-only memory (ROM)/random-access memory (RAM), a magnetic disk, or a compact disc read-only memory (CD-ROM), including several instructions for causing a computer device (a personal computer, a server, or a network device) to perform the method in various embodiments or some of the embodiments of the present disclosure.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or derive equivalent replacements to some of the technical features; however, such modifications or replacements do not cause the essence of the corresponding technical solutions to depart from the spirit and scope of the technical solutions of the embodiments of the present disclosure.

What is claimed is:

1. An automatic focusing projection method, the method being applicable to an automatic focusing projection system, the automatic focusing projection system comprising a ranging unit, a projection unit, and a reflection unit, wherein the ranging unit is configured to acquire a depth image, the projection unit is configured to project an image, and the reflection unit is configured to change a direction of outgoing light of the projection unit; and the automatic focusing projection method comprises:

acquiring a depth image from the ranging unit, and acquiring a vertical projection distance from the ranging unit to a projection plane based on the depth image;

acquiring position information of a center point of a projection picture in the depth image based on an elevation angle of the reflection unit and the vertical projection distance;

acquiring a projection distance between the projection unit and the projection picture based on the position information; and performing focus adjustment on the projection unit based on the projection distance.

2. The automatic focusing projection method according to claim 1, wherein acquiring the depth image from the ranging unit, and acquiring the vertical projection distance from the ranging unit to the projection plane based on the depth image comprise:

acquiring the depth image from the ranging unit, and determining a depth corresponding to a center position of the depth image as the vertical projection distance.

3. The automatic focusing projection method according to claim 2, wherein acquiring the position information of the center point of the projection picture in the depth image based on the elevation angle of the reflection unit and the vertical projection distance comprises:

acquiring the position information based on the elevation angle, the vertical projection distance, and a first correspondence table, wherein the first correspondence table indicates a corresponding relationship among the elevation angle, the vertical projection distance, and the position information.

4. The automatic focusing projection method according to claim 3, further comprising:

acquiring the corresponding relationship among the elevation angle, the vertical projection distance, and the position information indicated in the first correspondence table; and establishing the first correspondence table based on the corresponding relationship.

5. The automatic focusing projection method according to claim 1, wherein the projection unit comprises a focusing device and a projection lens movable along an optical axis, and performing focus adjustment on the projection unit based on the projection distance comprises:

acquiring a target position of the projection lens based on the projection distance; and controlling, based on the target position, the focusing device to move the projection lens to the target position.

6. The automatic focusing projection method according to claim 5, wherein acquiring the target position of the projection lens based on the projection distance comprises:

acquiring the target position of the projection lens based on the projection distance and a second correspondence table, wherein the second correspondence table characterizes a corresponding relationship between the projection distance and a position of the projection lens.

7. An automatic focusing projection system, comprising: a ranging unit, a projection unit, a reflection unit, and a control unit; wherein the control unit is connected to the ranging unit, the projection unit, and the reflection unit;

the ranging unit is configured to acquire a depth image;

the projection unit is configured to project an image, wherein the projection unit comprises a focusing device and a projection lens movable along an optical axis, the focusing device being configured to regulate a position of the projection lens;

the reflection unit is configured to change a direction of outgoing light of the projection unit; and the control unit comprises:

at least one processor, and a memory communicably connected to the at least one processor, wherein the memory is configured to store one or more instructions executable by the at least one processor, wherein the one or more instructions, when executed by the at least one processor, causes the at least one processor to perform:

acquiring a depth image from the ranging unit, and acquiring a vertical projection distance from the ranging unit to a projection plane based on the depth image;

acquiring position information of a center point of a projection picture in the depth image based on an elevation angle of the reflection unit and the vertical projection distance;

acquiring a projection distance between the projection unit and the projection picture based on the position information; and performing focus adjustment on the projection unit based on the projection distance.

8. The automatic focusing projection system according to claim 7, wherein acquiring the depth image from the ranging unit, and acquiring the vertical projection distance from the ranging unit to the projection plane based on the depth image comprise:

acquiring the depth image from the ranging unit, and determining a depth corresponding to a center position of the depth image as the vertical projection distance.

9. The automatic focusing projection system according to claim 8, wherein acquiring the position information of the center point of the projection picture in the depth image based on the elevation angle of the reflection unit and the vertical projection distance comprises:

acquiring the position information based on the elevation angle, the vertical projection distance, and a first correspondence table, wherein the first correspondence table indicates a corresponding relationship among the elevation angle, the vertical projection distance, and the position information.

10. The automatic focusing projection system according to claim 9, wherein the one or more instructions, when executed by the at least one processor, further causes the at least one processor to perform:

acquiring the corresponding relationship among the elevation angle, the vertical projection distance, and the position information indicated in the first correspondence table; and establishing the first correspondence table based on the corresponding relationship.

11. The automatic focusing projection system according to claim 7, wherein the projection unit comprises a focusing device and a projection lens movable along an optical axis, and performing focus adjustment on the projection unit based on the projection distance comprises:

acquiring a target position of the projection lens based on the projection distance; and controlling, based on the target position, the focusing device to move the projection lens to the target position.

12. The automatic focusing projection system according to claim 11, wherein acquiring the target position of the projection lens based on the projection distance comprises:

acquiring the target position of the projection lens based on the projection distance and a second correspondence table, wherein the second correspondence table characterizes a corresponding relationship between the projection distance and a position of the projection lens.

13. The automatic focusing projection system according to claim 7, wherein the reflection unit is a mirror, the mirror having a minimum elevation angle and a maximum elevation angle, and a half angle of view of the ranging unit satisfies:

$$\theta > \tfrac{1}{2}(\beta_{max} - \beta_{min})$$

wherein $\theta$ represents the half angle of view of the ranging unit, $\beta_{min}$ represents the minimum elevation angle of the mirror, $\beta_{max}$ and represents the maximum elevation angle of the mirror.

14. The automatic focusing projection system according to claim 13, wherein the ranging unit is a 3D camera, a TOF sensor, and/or a structured light camera.

15. A computer program product, comprising one or more computer programs stored in a non-volatile computer readable storage medium, wherein the computer programs comprise one or more program instructions, which, when executed by an electronic device, cause the electronic device to perform:
   acquiring a depth image from the ranging unit, and acquiring a vertical projection distance from the ranging unit to a projection plane based on the depth image;
   acquiring position information of a center point of a projection picture in the depth image based on an elevation angle of the reflection unit and the vertical projection distance;
   acquiring a projection distance between the projection unit and the projection picture based on the position information; and
   performing focus adjustment on the projection unit based on the projection distance.

16. The computer program product according to claim 15, wherein the projection unit comprises a focusing device and a projection lens movable along an optical axis, and performing focus adjustment on the projection unit based on the projection distance comprises:
   acquiring a target position of the projection lens based on the projection distance; and
   controlling, based on the target position, the focusing device to move the projection lens to the target position.

17. The computer program product according to claim 16, wherein acquiring the target position of the projection lens based on the projection distance comprises:
   acquiring the target position of the projection lens based on the projection distance and a second correspondence table, wherein the second correspondence table characterizes a corresponding relationship between the projection distance and a position of the projection lens.

* * * * *